United States Patent [19]

Breddels et al.

[11] Patent Number: 4,830,469
[45] Date of Patent: May 16, 1989

[54] LIQUID CRYSTALLINE COLOR DISPLAY CELL HAVING A PHOSPHORESCENT SUBSTRATE AND U.V.-ABSORBING DICHROIC DYE

[75] Inventors: Paulus A. Breddels; Hendrik A. Van Sprang, both of Eindhoven, Netherlands

[73] Assignee: U.S. Philips Corporation, New York, N.Y.

[21] Appl. No.: 149,043

[22] Filed: Jan. 27, 1988

[30] Foreign Application Priority Data

Feb. 13, 1987 [NL] Netherlands .......................... 8700347

[51] Int. Cl.$^4$ ................................................ G02F 1/13
[52] U.S. Cl. ................................. 350/345; 350/339 F; 350/349
[58] Field of Search .................... 350/345, 349, 350 F, 350/339 F

[56] References Cited

U.S. PATENT DOCUMENTS

| | | | |
|---|---|---|---|
| 3,833,287 | 9/1974 | Taylor et al. | 350/349 |
| 4,470,666 | 9/1984 | Eick | 350/345 X |
| 4,556,287 | 12/1985 | Funada et al. | 350/350 F X |

FOREIGN PATENT DOCUMENTS 54-4596  1/1979  Japan ................................ 350/339 F Primary Examiner—Stanley D. Miller
Assistant Examiner—Richard Gallivan
Attorney, Agent, or Firm—Paul R. Miller

[57] ABSTRACT

A liquid crystalline color display cell comprises two transparent, parallel substrate plates, 1, 2 (FIG. 1), a seal 3 and a liquid crystalline cell medium 5 which is present between the plates and the ring. The cell medium contains a dichroic, UV light-absorbing substance. Both substrate plates are provided with electrodes 6, 7 and the substrate plate are provided on the viewing side with a layer 9 of phosphors which emit colored light under the influence of UV light.

6 Claims, 1 Drawing Sheet

LIQUID CRYSTALLINE COLOR DISPLAY CELL HAVING A PHOSPHORESCENT SUBSTRATE AND U.V.-ABSORBING DICHROIC DYE

The invention relates to a liquid crystalline colour display cell comprising two parallel, spatially separated transparent substrate plates which are provided with electrodes on their facing surfaces, and which are interconnected along the periphery by means of a seal, these substrate plates enclosing a space which is filled with a liquid crystalline cell medium having a 180°–360° twist across the cell thickness.

Herein "twist" is to be understood to mean a rotation of the director of the longitudinal axes of the molecules of the liquid crystalline compound across the cell thickness, i.e. from one substrate plate to the other.

BACKGROUND OF THE INVENTION

In recent years the attention for a display cell having a 180°–360° twist has grown steadily. This applies more particularly to a display cell having a 180°–270° twist and more notably to one having a 270° twist. During operation the cell is exposed to linearly polarised white light which is incident via the transparent substrate plate. During its passage through the cell the linearly polarised light is changed into elliptically polarised light due to birefringence of the cell medium and the twist configuration. The cell having a 180°–360° twist is known as STN cell, i.e. supertwist nematic cell. The special STN cell having a 270° twisted configuration is known as supertwist birefringence effect (SBE) cell.

The advantage of this type of cell relative to, in particular, the well-known twisted nematic cell (TN cell) having a 90° twist is the steep transmission-voltage characteristic. This means that when a voltage is applied across the cell, a large difference in transmission of the light through the cell occurs in a very small voltage range around a threshold value. Thus, it becomes possible to control a large number of lines by means of time multiplexing, yielding a high information density.

The STN or SBE cell also has disadvantages. The first disadvantage being that two polarisers are required. The cell is operated only with linearly polarised light. When no voltage or a voltage below the threshold voltage is applied across the electrodes of the cell, the director exhibits the above-mentioned 180°–360° twist and preferably a 270° twist. The cell is exposed to linearly polarised light via the polariser, which light passes through the cell via the transparent substrate plate and the transparent electrode in a direction perpendicular to the substrate plates. Due to birefringence the linearly polarised light is changed into elliptically polarised light. This change depends on the wavelength. At the analyser connected to the other substrate plate a spectrum is obtained; a coloured effect. Which spectrum—more in particular which colour effect—is obtained depends on several factors. One important factor being the selected position of the analyser relative to the polariser. The type of liquid crystalline material also plays a part. In fact the analyser provides a cross-section through the various ellipses. In the case of the SBE cell this results, for example, in a blue-white contrast or a yellow-black contrast for parallel and crossed polarisers, respectively.

When a voltage equal to or larger than the threshold voltage is applied across the cell thickness by means of the electrodes, the molecules of the liquid crystalline cell medium are oriented in conformity with the field lines. This causes the twist to disappear and a situation of optical isotropy to occur. The light transmission changes. This causes the above-stated contrast of a SBE cell.

A second important disadvantage of the STN (SBE) cell is that it is not suitable for use as a colour display cell in, for example, a colour TV. A first requirement to be met by a colour display cell is that black-white operation must be possible, as in the case of a TN cell having a 90° twist. When the TN cell is in the non-energised state, white linearly polarised light is passed when the polariser and the analyser intersect, such that each colour can be obtained by means of colour filters. In the energised state, and the polariser and analyser intersecting, the white linearly polarised light is fully absorbed. However, a TN cell has the disadvantage that the transmission-voltage characteristic is less steep.

It has been tried to obtain or substantially obtain a black-white effect in a SBE cell by adding a colourant which absorbs the dominating spectral component. It has been found, however, that such large concentrations of colourant are needed that it adversely affects the transmission-voltage characteristic.

SUMMARY OF THE INVENTION

It is an object of the invention to provide a display cell having a 180°–360° twist, which can be employed as a colour display cell.

A further object is to provide a colour display cell having a steep transmission-voltage characteristic.

Yet another object of the invention is to provide a colour display cell having a sharp contrast and a high brightness.

These objects are achieved according to the present invention by a liquid crystalline colour display cell of the type mentioned in the opening paragraph, which is characterized in that one of the two transparent substrate plates is provided with phosphors which emit visible light under the influence of UV light, in that the cell medium contains a dichroic UV light-absorbing substance, and in that the cell contains maximally one polariser.

During operation of the liquid crystalline colour display cell according to the invention, the cell is exposed to UV light via the transparent substrate plate (first substrate plate) which does not contain phosphors. This light need not be linearly polarised. A voltage pattern which is representative of the colour picture to be displayed is applied to the electrodes which according to a customary construction are formed of column electrodes and row electrodes which cross each other at right angles and which can each be controlled electrically. In the non-energised areas of the cell medium located between the plates, i.e. no voltage is applied to the respective electrodes, or in the areas where there is a weak electric field whose value is below a threshold value, the cell medium will exhibit a 180°–360° twist.

The molecules of the liquid crystalline cell medium follow this twisted configuration. In the case of a twist of 270° across the cell, the molecules of the liquid crystalline material have at the location of the interface between the medium and substrate wall a tilted orientation with a tilt angle of approximately 15°–30° relative to the surface of the substrate plate. More toward the center of the cell the tilt angle of the molecules decreases to a value of no more than a few degrees. Dependent upon the twist configuration other tilt angles are also possible. For the sake of convenience this twist configuration with a tilted orientation will hereinafter be called the non-excited or voltageless state.

In the areas of the cell medium where an electric field is applied because a voltage higher than the threshold voltage is applied to the electrodes on both sides of the cell medium, the orientation of the molecules of the cell medium will be in accordance with the field lines, and will be perpendicular or substantially perpendicular to the electrodes and, hence, to the substrate plates. This perpendicular orientation will hereinafter be called the voltage-fed or excited state.

The dichroic, UV light-absorbing substance present in the cell medium is a substance whose molecules exhibit a UV light-absorbing characteristic which in one direction of the molecule, particularly the longitudinal direction, differs from that in another direction of the molecule, in particular a direction normal to the longitudinal direction. Due to this dichroism in regard to the degree of UV light-absorption, the molecules of the substance will in the non-excited state exhibit a UV light-absorption which is different from that in the above-mentioned excited state.

In an advantageous embodiment the UV light-absorption is minimal in one state, and in the other state all of the UV light is absorbed, such that a maximum constrast is obtained.

More in particular, for example, in the nonexcited state all of the UV light which is incident via the transparent substrate plate is absorbed, and in the excited state no or only a small percentage of light is absorbed. Consequently, in the excited state the UV light will pass through the medium and be incident on a phosphor area present on the second substrate plate, which, consequently, emits a coloured, for example red, green or blue light beam which is visible to the human eye or can otherwise be made visible.

In an advantageous embodiment of the display cell according to the invention, the cell medium contains a dichroic substance which absorbs UV light having a wavelength of approximately 360–370 nm.

In this way several advantages are obtained. A first favourable aspect is that UV light of the aforesaid wavelength is not absorbed by glass, consequently, the substrate plates may be made of glass. A second advantage is that most of the phosphors are sensitive to UV light of 360–370 nm. Thus, many phosphors are suitable, and more in particular those which are used in colour television screens. A third additional advantage is that UV light of 360–370 nm is of a still rather long wavelength, thereby limiting any decomposition of the cell medium.

According to another preferred embodiment of the display cell according to the invention, a liquid crystalline substance is used in the cell medium, which itself is dichroic in regard to UV light absorption. The liquid crystalline substances in question have an aromatic ring structure. An example of such a substance has the following formula

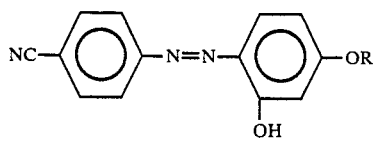

where R is an alkyl residue having, for example, 4–10 carbon atoms such as a hexyl ($-C_6H_{13}$) residue.

In a further preferred embodiment of the display cell according to the invention, besides a liquid crystalline compound the cell medium also contains a colourant which is dichroic in regard to UV light-absorption. In this case the liquid crystalline compound does not have to meet any particular requirements. This means that the usual, commercially available liquid crystalline substances or mixtures thereof can be used. The molecules of the dichroic colourant present in the cell medium exhibit, just like the molecules of the liquid crystalline compound, a different orientation (molecular position) dependent upon whether the display cell is in the non-excited or in the excited state. This difference in orientation leads to a difference in UV light-absorption. A suitable dichroic UV light-absorbing colourant is, for example, a substance of the following formula

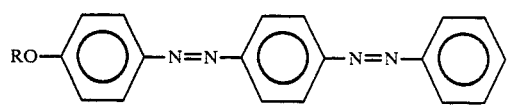

where R is an alkyl group having, for example, 1–10 carbon atoms such as a butyl group or an ethyl group.

The quantity of the dichroic UV light-absorbing colourant is, for example, from 0.5–5% by weight, and more in particular from 1.5–3% by weight.

The display cell according to the invention is based on the absorption of UV light and will hereinafter also be called SAE cell, i.e. supertwist absorption effect cell. The difference between this cell and the SBE or STN cell is that the latter operate on the basis of double refraction. This difference is an essential one.

An important difference between the SAE cell according to the invention and the SBE or STN cell is that in the former maximally one and preferably no polarisers are used. In the SBE cell two polarisers are required, one on the side of the lamp to obtain linearly polarised light and one on the viewing side (analyser) to at least partly absorb the elliptically polarised light formed in the cell. Both polarisers are essential for the operation of the SBE cell. The use of two polarisers leads to additional costs. A further important drawback is that the use of two polarisers reduces the light output to 15% and, consequently, results in a low picture brightness.

A further difference is that in the SAE cell UV light is used and that it contains a UV light-absorbing substance. In the SBE cell linearly polarised visible light is used and, in particular, linearly polarised white light. In the SAE cell birefringence does not play a part, but absorption of UV light takes place in the non-excited (twist) state of the cell. The UV light does not have to be linearly polarised light. Owing to the various orientations of the molecules of the UV-absorbing substance in the twist, there is always at least one orientation which corresponds to the direction of polarisation of the UV light used which is consequently absorbed by the UV absorbing substance.

If necessary, the contrast in the SAE cell can be increased by the use of one polariser. In this case the cell operates on the basis of absorption of polarised UV light. Dependent upon the circumstances, the degree of absorption of the polarised UV light by the UV absorbing substance may be slightly larger than that of non-polarised UV light. This polariser may be provided both on the viewing side and on the lamp side of the display cell. However, it is to be preferred to provide it on the lamp side. Providing it on the viewing side has the drawback that the polariser must be arranged between the electrode and the layer of phosphors, which leads to practical problems. This is particularly true when an interference filter is also provided between the electrode and the layer of phosphors, which filter passes UV light and reflects visible light emitted by the phosphors during excitation.

As has been stated above, the SBE cell is operated with visible light, which results in the development of a coloured effect such as a yellow or blue picture against a white or black background. Applicants have carried out tests in which the SBE cell was exposed to linearly polarised UV light. These tests show that the transmission of such a cell does not only largely depend upon the wavelength but also upon the temperature. An optimum transmission through the analyser at a predetermined wavelength and an accurately adjusted cell thickness was found to change dramatically, even to a minimum transmission, due to a change in temperature of a few degrees. As has been stated above, the SAE cell according to the invention is operated according to a different principle, absorption of UV light taking place in the cell medium. Unlike the SBE cell, polarisation of light, wavelength of light, temperature and cell thickness do not play a critical part. Nevertheless, the SAE cell has a very advantageous voltage-transmission characteristic.

Further advantages are the high brightness and sharp contrast which are obtained because maximally one polariser is used and no colour filters are employed. In regard to the sharp contrast it should be noted that the concentration of dichroic UV light-absorbing substance in the display cell may be very high. When a liquid crystalline compound is used which itself is dichroic in the UV wavelength range, a concentration of 100% is possible, dependent upon the purity of the substance. Owing to such a high concentration compounds having a relatively low; specific UV absorption can be used.

The phosphors are provided on the second substrate plate (viewing side); this is the plate which confronts the first substrate plate (lamp side). Preferably, the phosphors are provided on the inner wall of the second substrate plate, which faces the cell medium. Consequently, the UV light which passes through the cell medium directly excites the phosphors without the light having to pass the second substrate plate first. Thus, parallux is avoided.

Suitable phosphors for UV light having a relatively long wavelength (370) are, for example, ZnS:AG—blue—; (Zn, Cd) S:Cu,Al—green— and Y$_2$O$_2$S:Eu—red—.

It has been mentioned hereinbefore that to obtain a 180°-360° supertwist the molecules of the liquid crystalline compound must have a tilted orientation at the substrate surface. Such an orientation is obtained by providing the substrate surface with an orientation layer of, for example, an obliquely evaporated SiO layer. The direction of evaporation is at an angle of 86° to the normal to the substrate surface. The tilt angle obtained is 15°-30°. A second measure to obtain a 180°-360° supertwist is the addition to the cell medium of a chiral substance such as a compound of the formula

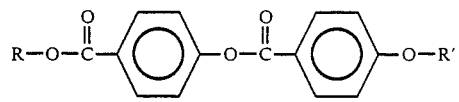

where R and R' are equal or unequal and represent an alkyl group having, for example, 4-10 carbon atoms, such as a hexyl group or an octyl group.

A further preferred embodiment of the colour display cell according to the invention is characterized in that the second substrate plate is provided with an interference filter between the electrodes and the phosphors, which filter passes UV light and reflects the light emitted by the phosphors.

In this way an even higher light output is obtained (a factor of 2-3 higher). The excitation light which is diffused in all directions by the phosphors is partly reflected by the interference filter, more in particular that part which is diffused—backwards—in the direction of the lamp side. In this way the light output on the viewing side, which is what matters, is increased.

The interference filter may be a so-called "all dielectric" multiplayer filter having at least 20 dielectric layers with alternately a high and a low refractive index. A so-called "metal-dielectric" filter may also be applied which is formed of only 3-5 layers of alternately a metal layer and a layer of dielectric material.

The invention further relates to a method of displaying a coloured picture using a colour display cell as described above, in which a voltage pattern in conformity with the picture to be displayed is applied to the electrodes located on both sides of the cell medium, the cell being exposed to UV light via the transparent substrate plate, the UV light being absorbed in those places of the cell medium which are located between non-excited electrodes, the UV light being passed in those areas of the cell medium where the electrodes are excited, or conversely, the transmitted UV light exciting the phosphor dots present on the other substrate plate, which then emit a coloured light beam.

BRIEF DESCRIPTION OF THE DRAWINGS

The invention will now be explained in more detail with reference to an exemplary embodiment and a drawing, in which.

DESCRIPTION OF THE PREFERRED EMBODIMENTS

Figure 1:
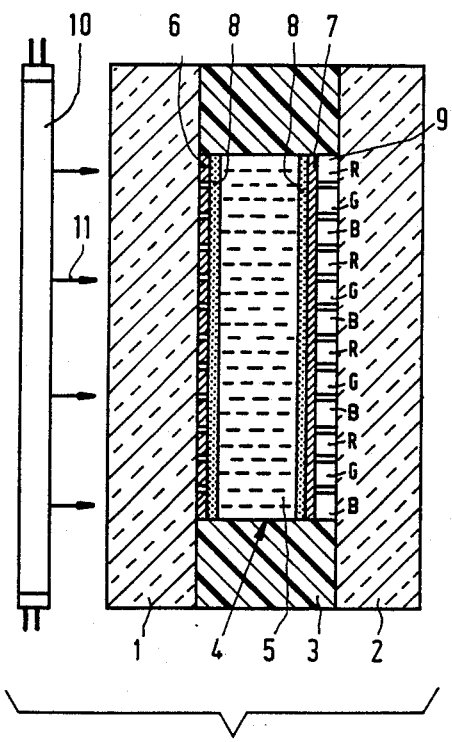
FIG. 1 is a cross-sectional view of a readily conceivable embodiment of the colour display cell according to the invention.

In FIG. 1 the reference numerals 1 and 2 refer to substrate plates. These plates are made of, for example, glass and are transparent to long wavelength UV light and to visible light. The plates are interconnected along their periphery by a seal 3 which consists of, for example, adhesive. The plates 1, 2 and the seal 3 enclose a space 4 which is filled with a liquid cell medium 5 containing the following components:
2.5% by weight of dichroic UV colourant of the formula

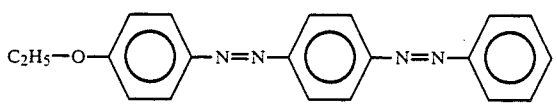

1% by weight of a chiral substance of the formula

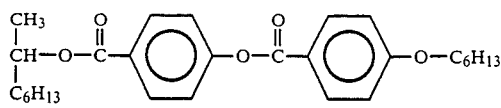

and a liquid crystalline material containing one or more compounds of the following formulae:

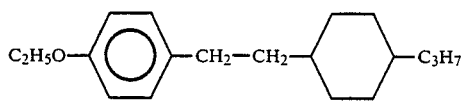

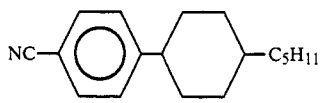

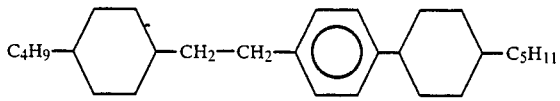

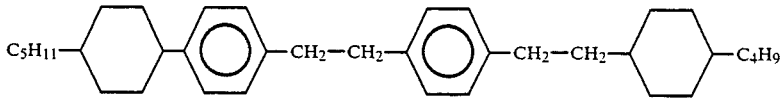

Such a material is marketed by Messrs Hoffmann-La Roche under the code ROTN 3010.

At the surfaces facing the cell medium 5 the plates 1 and 2 are provided with transparent track-like electrodes 6 and 7 which intersect each other perpendicularly to form a matrix of switching nodes. The electrodes are made of, for example, indium-tin oxide (ITO). The electrodes are covered by an orientation layer 8 of obliquely evaporated SiO. Substrate plate 2, i.e. the one on the viewing side, is further provided with a layer 9 of red, green and blue phosphor dots as described hereinbefore. The areas are indicated by the letters R (red), G (green) and B (blue). A high-pressure mercury lamp 10 emitting UV light 11 with a wavelength of 370 nm is placed on the side of the substrate plate 1.

The colour display cell according to FIG. 1 operates as follows:

In conformity with the picture to be displayed a voltage pattern is applied to the electrodes 6 and 7. In the part of the cell medium 5 which is located between non-excited switching nodes or to which a voltage is applied which is lower than the threshold voltage, the molecules of the liquid crystalline compound have a twisted configuration with a 270° twist across the cell thickness. At the interface with the orientation layer the molecules have a tilted orientation with a tilt angle of approximately 20°. The molecules of the UV light-absorbing dichroic colourant follow the twisted configuration. In parts of the cell medium which are located between switching nodes to which a voltage higher than the threshold voltage is applied, there is an electric field which suffices to orient the molecules of the liquid crystalline compound and the UV light-absorbing dichroic colourant in conformity with the field lines which are perpendicular to the surface of the substrate plates 1 and 2.

The non-polarised UV light 11 is absorbed in the non-excited parts of the cell medium by the molecules of the UV light-absorbing dichroic colourant due to the orientation of these molecules in the twisted configuration. In the areas where the electric field strength is sufficiently large the UV light will pass through the cell medium 5 and be incident on a phosphor dot of layer 9. The phosphor dots in layer 9 are aligned with the switching nodes. The excited phosphor dot will emit excitation light (red, green or blue) which is visible with the human eye or otherwise on the viewing side of the display cell (the side of substrate plate 2).

Figure 2:
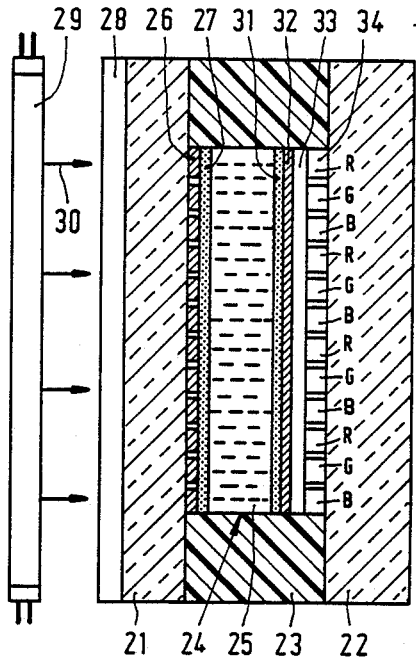
FIG. 2 is a cross-sectional view of another embodiment of the colour display cell according to the invention.

In FIG. 2 the reference numerals 21 and 22 refer to two substrate plates which are made of glass and which are transparent to UV light and visible light. The plates are interconnected along the periphery by means of a seal 23. The cavity 24 is filled with a liquid cell medium 25 of the following compostion:

3% by weight of the dichroic colourant

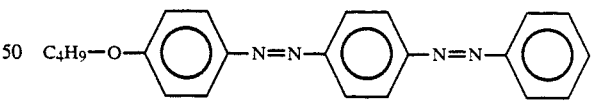

0.5% by weight of the chiral substance

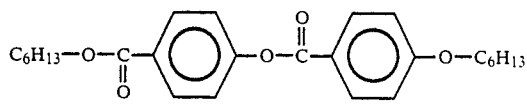

and a liquid crystalline material which contains a mixture of the following substances:

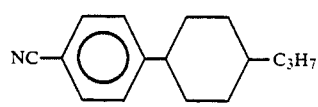

-continued

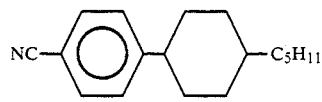

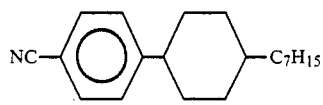

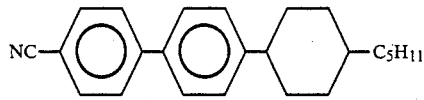

This mixture is marketed by Messrs. Merck under the code ZLI 1132.

On the side of the cell medium 25 the substrate plate 21 is provided with track-like, transparent electrodes 26 of, for example, indium-tin oxide which are covered with an orientation layer 27 of obliquely evaporated SiO. On the other side the substrate plate 21 is provided with a polariser 28. A lamp 29 which emits UV light 30 is provided parallel to the substrate plate 21. Starting from the cell medium 25 the substrate plate 22 (viewing side of the display cell) is provided with, in succession, an SiO orientation layer 31, track-like transparent electrodes 32 perpendicularly intersecting electrodes 26, such that the electrodes 26 and 32 together form a matrix of switching nodes, an interference filter 33 and a layer 34 of red (R), green (G) and blue (B) phosphor areas.

When the colour display cell according to FIG. 2 is operative, a voltage pattern is applied to the electrodes 26 and 32, which corresponds to the colour picture to be displayed. On the side of the lamp the cell is exposed to UV light 30 which upon passing through the polariser 28 becomes linearly polarised. The polarised light then passes the electrodes 26, the orientation layer 27 and the cell medium 25 in which the light is absorbed in places which are located between non-excited switching nodes. No absorption of the linearly polarised UV light takes place in the areas of the cell medium which are located between excited switching nodes. The transmitted light successively passes the orientation layer 31, the electrodes 32 and the interference filter 33, after which it is incident on a phosphor dot of layer 34. The excitation light of the phosphor dot is diffused in all directions. The light diffused in the direction of the interference filter 33 is reflected, thereby increasing the brightness of the light signal (red, green or blue) on the viewing side.

What is claimed is:

1. A liquid crystalline colour display cell comprising two parallel, spatially separated, transparent substrate plates having electrodes on their facing surfaces, and being interconnected along the periphery by means of a seal, said substrate plates enclosing a space which is filled with a liquid crystalline cell medium having a 180°-360° twist (rotation of the director) across the cell thickness, characterized in that one of the two transparent substrate plates is provided with phosphors emitting coloured light under the influence of ultraviolet light, in that the cell medium contains a dichroic, ultraviolet light-absorbing substance, in that the cell contains maximally one polariser, and characterized in that the cell medium contains a liquid crystalline compound and a dichroic, UV light-absorbing substance.

2. A liquid crystalline colour display cell as claimed in claim 1, characterized in that the cell medium contains a dichroic substance which absorbs ultraviolet light having a wavelength of approximately 360-370 nm.

3. A liquid crystalline colour display cell as claimed in claim 1 or 2, characterized in that the cell medium contains a liquid crystalline substance which itself is dichroic and UV light-absorbing.

4. A liquid crystalline colour display cell comprising two parallel, spatially separated, transparent substrate plates having electrodes on their facing surfaces, and being interconnected along the periphery by means of a seal, said substrate plates enclosing a space which is filled with a liquid crystalline cell medium having a 180°-360° twist (rotation of the director) across the cell thickness, characterized in that one of the two transparent substrate plates is provided with phosphors emitting coloured light under the influence of ultraviolet light, in that the cell medium contains a dichroic, ultraviolet light-absorbing substance, in that the cell contains maximally one polariser and, characterized in that the phosphors are provided on the inner wall of the substrate plate facing the cell medium.

5. A liquid crystalline colour display cell comprising two parallel, spatially separated, transparent substrate plates having electrodes on their facing surfaces, and being interconnected along the periphery by means of a seal, said substrate plates enclosing a space which is filled with a liquid crystalline cell medium hàving a 180°-360° twist (rotation of the director) across the cell thickness, characterized in that one of the two transparent substrate plates is provided with phosphors emitting coloured light under the influence of ultraviolet light, in that the cell medium contains a dichroic, ultraviolet light-absorbing substance, in that the cell contains maximally one polariser and, characterized in that the substrate plate being provided with phosphors contains an interference filter provided between the electrodes and the phosphors, said interference filter passing UV light and reflecting the excitation light produced by the phosphors.

6. A method of displaying a coloured picture, employing a colour display cell comprising two parallel, spatially separated, transparent substrate plates having electrodes on their facing surfaces, and being interconnected along the periphery by means of a seal, said substrate plates enclosing a space which is filled with a liquid crystalline cell medium having a 180°-360° twist (rotation of the director) across the cell thickness, characterized in that one of the two transparent substrate plates is provided with phosphors emitting coloured light under the influence of ultraviolet light, in that the cell medium contains a dichroic, ultraviolet light-absorbing substance, in that the cell contains maximally one polariser and characterized in that the cell medium contains a liquid crystalline compound and a dichroic, UV light-absorbing substance, in which a voltage pattern in accordance with the picture to be displayed is applied to the electrodes located on either side of the cell medium, the cell being exposed to UV light via the transparent substrate plate, in which the UV light is absorbed in those parts of the cell medium which are located between non-excited electrodes, and the UV light is passed in those parts of the cell medium where the electrodes located on either side of the cell medium are excited, or conversely, in which the transmitted UV light excites the phosphor dots provided on the other substrate plate, which then emit a coloured light beam.

* * * * *